US012679433B2

(12) United States Patent
Liu

(10) Patent No.: US 12,679,433 B2
(45) Date of Patent: Jul. 14, 2026

(54) HANDCART

(71) Applicant: QINGDAO HUATIAN HAND TRUCK CO., LTD., Qingdao (CN)

(72) Inventor: Zhijun Liu, Qingdao (CN)

(73) Assignee: QINGDAO HUATIAN HAND TRUCK CO., LTD., Qingdao (CN)

( * ) Notice: Subject to any disclaimer, the term of this patent is extended or adjusted under 35 U.S.C. 154(b) by 267 days.

(21) Appl. No.: 18/650,698

(22) Filed: Apr. 30, 2024

(65) Prior Publication Data

US 2025/0296610 A1     Sep. 25, 2025

(30) Foreign Application Priority Data

Mar. 21, 2024    (CN) ......................... 202420551089.X

(51) Int. Cl.
| | |
|---|---|
| *B25H 1/04* | (2006.01) |
| *B62B 1/00* | (2006.01) |
| *B62B 1/18* | (2006.01) |
| *B62B 1/22* | (2006.01) |
| *B62B 5/06* | (2006.01) |

(52) U.S. Cl.
CPC .............. *B62B 1/18* (2013.01); *B62B 1/008* (2013.01); *B62B 1/22* (2013.01); *B62B 5/067* (2013.01); *B25H 1/04* (2013.01)

(58) Field of Classification Search
CPC .... B62B 1/18; B62B 1/20; B62B 1/22; B62B 1/008; B62B 5/067; B62B 5/06; B62B 5/0457; B62B 5/0447; B25H 1/04; F16C 11/04
See application file for complete search history.

(56) References Cited

U.S. PATENT DOCUMENTS

| | | | | |
|---|---|---|---|---|
| 5,887,878 | A * | 3/1999 | Tisbo ........................ | B62B 1/20 |
| | | | | 280/47.35 |
| 8,052,158 | B2 * | 11/2011 | Tyrrell .................. | B62B 3/1472 |
| | | | | 280/47.35 |
| 8,979,098 | B2 * | 3/2015 | Wang ...................... | B62B 3/022 |
| | | | | 280/651 |
| 10,682,754 | B2 * | 6/2020 | Firth ........................ | B25H 1/10 |
| 11,130,511 | B2 * | 9/2021 | Abohammdan ........ | B62B 3/005 |
| 11,433,528 | B1 * | 9/2022 | Crom ....................... | B25H 1/12 |

FOREIGN PATENT DOCUMENTS

CN        111645747 A  *  9/2020  ............... B62B 3/02

OTHER PUBLICATIONS

Mechanical translation of CN111645747A. (Year: 2020).*

* cited by examiner

*Primary Examiner* — John D Walters
(74) *Attorney, Agent, or Firm* — Birchwood IP

(57) ABSTRACT

Disclosed is a handcart, including: a frame, where the frame includes an accommodating cavity for accommodating goods and two stand columns, where the two stand columns are correspondingly arranged and connected to the frame, forming a stand column pair, and the extension direction of the stand column pair is perpendicular to the frame; wheels that are connected to the frame and arranged relative to the frame in a rotatable manner; a workbench that is arranged on the frame, configured for carrying goods, and located outside the accommodating cavity; a plurality of bearing platforms that are arranged inside the accommodating cavity, located on both sides of the stand column pair, parallel to the workbench, and spaced apart from each other, so that each bearing platform is on a unique horizontal plane.

9 Claims, 7 Drawing Sheets

HANDCART

CROSS-REFERENCE TO RELATED APPLICATIONS

The application claims priority to Chinese patent application No. 202420551089.X, filed on Mar. 21, 2024, the entire contents of which are incorporated herein by reference.

TECHNICAL FIELD

The present disclosure relates to the technical field of carts for transporting goods, and particularly relates to a handcart.

BACKGROUND

As a transport means suitable for short-distance transport of goods, carts have been widely applied in various fields such as airports, stations, medical treatment, etc. due to their portability and flexibility.

Regarding the transport of goods, conventionally a plurality of pieces of goods are stacked first and then placed on a cart for transport. When necessary to handle certain goods in transit, other goods on the top thereof need to be unloaded first, and then reloading the unloaded goods onto the cart is required. Or, no suitable operating platform is available for on-site assembly of goods delivered to the destination, thus affecting the assembly efficiency.

Thus, the prior art is required to be further improved.

SUMMARY

In order to overcome the above technical defects, the present disclosure provides a handcart to solve the technical problem in related art that existing handcarts have a single function and are not capable of meeting the needs of various working scenarios.

To achieve the above objective, the present disclosure adopts the following technical solution: a frame, where the frame includes an accommodating cavity for accommodating goods and two stand columns, where the two stand columns are correspondingly arranged, the two stand columns are connected to the frame, the two stand columns form a stand column pair, and the extension direction of the stand column pair is perpendicular to the frame; wheels, where the wheels are connected to the frame, and the wheels are arranged relative to the frame in a rotatable manner; a workbench, where the workbench is arranged on the frame, the workbench is configured for carrying goods, and the workbench is located outside the accommodating cavity; a plurality of bearing platforms, where all the plurality of bearing platforms are arranged inside the accommodating cavity, the plurality of bearing platforms are located on both sides of the stand column pair, the plurality of bearing platforms are parallel to the workbench, and the plurality of bearing platforms are spaced apart from each other, so that each bearing platform is on a unique horizontal plane.

Further, the stand column pair is located in the middle of the frame, the wheels are located at one end of the frame, and the plurality of bearing platforms include a first bearing platform and a second bearing platform, where the first bearing platform is located between the wheels and the workbench, the second bearing platform is arranged on one side of the stand column pair away from the first bearing platform, and the distance between the first bearing platform and the workbench is less than the distance between the second bearing platform and the workbench.

Further, support legs are arranged at one end of the frame away from the wheels, the support legs are fixed on the frame, and the support legs are configured to support the handcart, so that the handcart is in the static state.

Further, two wheels and two support legs are arranged, the two wheels and the two support legs are respectively located on both sides of the frame, and the two wheels and the two support legs are correspondingly arranged.

Further, the handcart further includes: handles, where the handles are connected to the frame, and the handles are located at one end of the frame away from the wheels; an adjusting assembly, where the adjusting assembly is fixed on the frame, the handles are connected to the adjusting assembly, and the handles are rotatably arranged relative to the adjusting assembly, so that the handles, by rotating, can be opened or retracted.

Further, the adjusting assembly includes: an adjusting plate, where the adjusting plate is fixed on the frame; an arc-shaped slot, where the arc-shaped slot is arranged to penetrate through the adjusting plate; and a first fixing member, where the first fixing member penetrates through the arc-shaped slot and is connected to the handles. The first fixing member slides in the arc-shaped slot to drive the handles to rotate relative to the adjusting assembly.

Further, the adjusting assembly further includes: a shifting slot, where the shifting slot is arranged to penetrate through the adjusting plate, and when the handles are in the opened state, the extension direction of the shifting slot is parallel to the extension direction of the handles; a second fixing member, where the second fixing member penetrates through the shifting slot and is connected to the handles, the second fixing member is rotatably arranged relative to the handles, and the second fixing member is movably arranged inside the shifting slot; and a clamping slot, where the clamping slot is communicated with the arc-shaped slot, the first fixing member can be movably arranged in both the clamping slot and the arc-shaped slot, the extension direction of the clamping slot and the extension direction of the shifting slot are on the same straight line, and the clamping slot is configured for clamping the first fixing member.

Further, the length of the clamping slot is the same as the length of the shifting slot.

Further, the handcart further includes two clamping components, both the two clamping components are connected to the frame, the two clamping components are located at both ends of the workbench respectively, and the goods carried on the workbench are clamped through the two clamping components.

Further, a placement space is arranged between the frame and either of the two clamping components, and tools of a certain length sequentially penetrate through the two placement spaces, so that they are clamped by the two clamping components.

Beneficial Effects

1. In the handcart of the present disclosure, bearing platforms of different heights are arranged inside the frame to accommodate goods of different sizes, a workbench is arranged on the frame for real-time placement and handling of goods, and wheels and support legs are installed at the bottom of the frame to facilitate transport and parking. The handcart with diverse functions is suitable for various work scenarios, and is widely applied.

2. The frame of the handcart of the present disclosure is designed to be rectangular, and the handcart can be placed upright (inverted) when not in use to reduce the occupation of site area; and the handles can be rotatably arranged, thus further reducing the use space.

3. The clamping components of the handcart of the present disclosure are capable of clamping tools of certain lengths and enriching the types of goods that can be transported, thus ensuring smooth transport.

Figure 1:
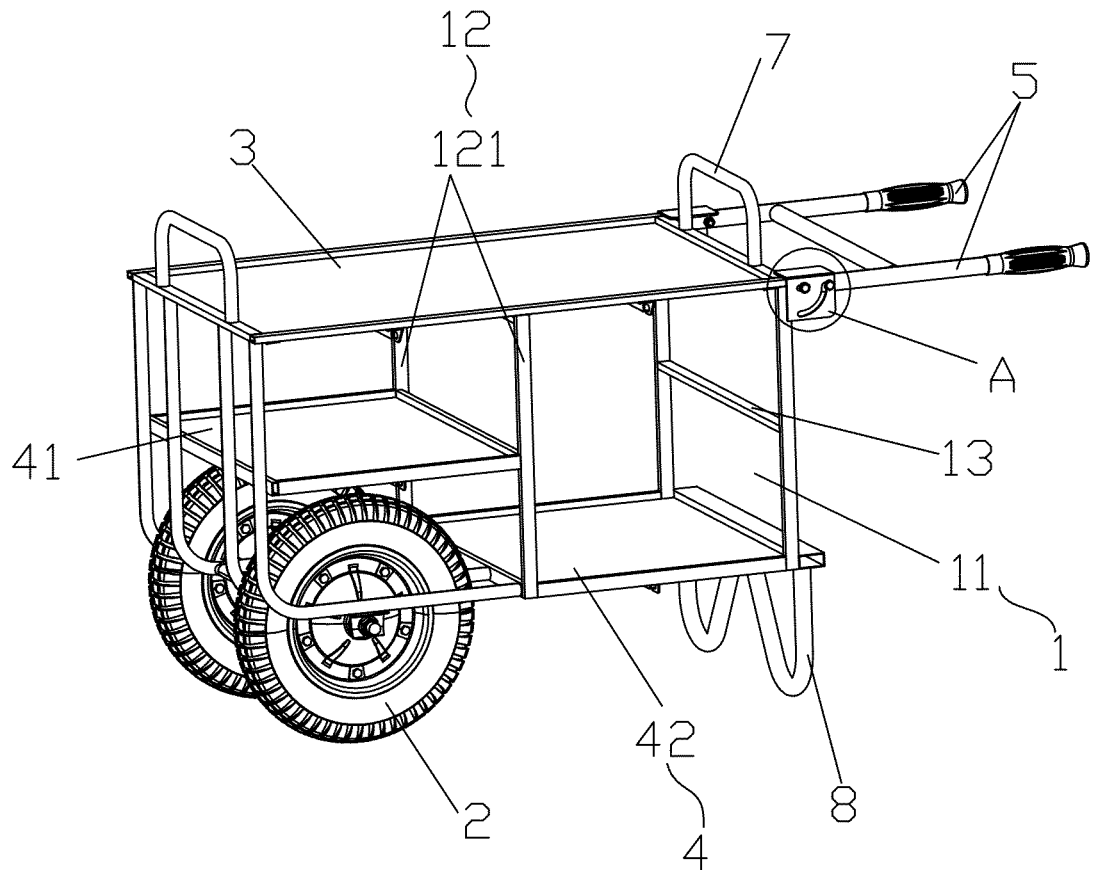
FIG. 1 is a schematic diagram of a handcart with handles in the opened state used in an embodiment of the present disclosure.

The above figures include the following reference numerals:

1, frame; 11, accommodating cavity; 12, stand column pair; 121, stand column; 13, fixing rod; 2, wheel; 3, workbench; 31, working plate; 4, bearing platform; 41, first bearing platform; 42, second bearing platform; 5, handle; 6, adjusting assembly; 61, adjusting plate; 62, arc-shaped slot; 63, first fixing member; 64, shifting slot; 65, second fixing member; 66, clamping slot; 7, clamping component; 71, placement space; 8, support leg; 9, telescopic assembly; 91, first telescopic rod; 92, first sleeve; 93, first locking member; 94, second telescopic rod; 95, second sleeve; 96, second locking member; 97, first connecting rod; and 98, second connecting rod.

DESCRIPTION OF EMBODIMENTS

In order to enable those skilled in the art to better understand the technical solutions of the present disclosure, the technical solutions in the embodiments of the present disclosure will be clearly and completely described below in combination with the accompanying drawings in the embodiments of the present disclosure. Apparently, the embodiments described are merely some rather than all of the embodiments of the present disclosure. Based on the embodiments of the present disclosure, all other embodiments acquired by those of ordinary skill in the art without making creative efforts fall within the scope of protection of the present disclosure.

According to an embodiment of the present disclosure, there is provided a handcart. With reference to FIGS. 1 to 7, the handcart includes: a frame 1, where the frame 1 includes an accommodating cavity 11 for accommodating goods and two stand columns 121, where the two stand columns 121 are correspondingly arranged, the two stand columns 121 are connected to the frame 1, the two stand columns 121 form a stand column pair 12, and the extension direction of the stand column pair 12 is perpendicular to the frame 1;

wheels 2, where the wheels 2 are connected to the frame 1, and the wheels 2 are arranged relative to the frame 1 in a rotatable manner; a workbench 3, where the workbench 3 is arranged on the frame 1, the workbench 3 is configured for carrying goods, and the workbench 3 is located outside the accommodating cavity 11; a plurality of bearing platforms 4, all the plurality of bearing platforms 4 are arranged inside the accommodating cavity 11, the plurality of bearing platforms 4 are located on both sides of the stand column pair 12, the plurality of bearing platforms 4 are parallel to the workbench 3, and the plurality of bearing platforms 4 are spaced apart from each other, so that each bearing platform 4 is on a unique horizontal plane. The workbench 3 is arranged on the frame 1, and when the handcart is in a static state, the workbench 3 not only is capable of carrying goods, but also can be used as an operating platform. The stand column pair 12 formed by the two stand columns 121 divides the accommodating cavity 11 of the frame 1 into two areas, the plurality of bearing platforms 4 are arranged in the two areas, and the plurality of bearing platforms 4 are spaced apart from each other and parallel to the workbench 3, so that each bearing platform 4 is on a unique horizontal plane, and the bearing platform 4 is capable of carrying goods of different heights. Such a design, without need of moving other goods, enables direct retrieval of goods from the corresponding bearing platform 4, and reduces the labor intensity of transport personnel. In addition, when it is required to temporarily place or assemble goods in transit, the goods can be placed on the workbench 3 for operation. The handcart with diverse functions is capable of working in different scenarios. The handcart of this embodiment solves the technical problem in related art that existing handcarts have a single function and are not capable of meeting the needs of various working scenarios.

Figure 2:
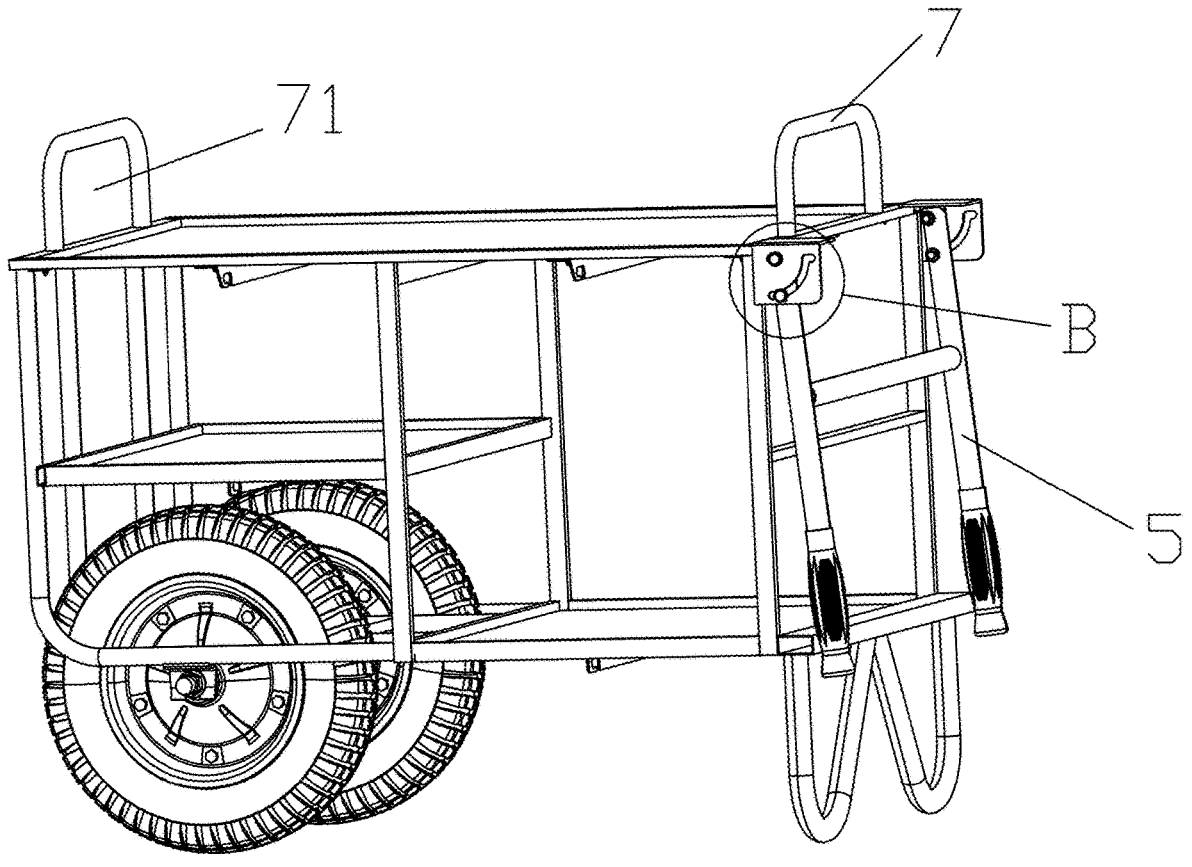
FIG. 2 is a schematic diagram of a handcart with handles in the retracted state used in an embodiment of the present disclosure.

With reference to FIGS. 1 and 2, in the handcart of this embodiment, the stand column pair 12 is located in the middle of the frame 1, the wheels 2 are located at one end of the frame 1, and the plurality of bearing platforms 4 include a first bearing platform 41 and a second bearing platform 42, where the first bearing platform 41 is located between the wheels 2 and the workbench 3, the second bearing platform 42 is arranged on one side of the stand column pair 12 away from the first bearing platform 41, and the distance between the first bearing platform 41 and the workbench 3 is less than the distance between the second bearing platform 42 and the workbench 3. The height of the first bearing platform 41 from the workbench 3 is lower than the height of the second bearing platform 42 from the workbench 3. According to the height and size, the goods can be placed in a certain area flexibly and conveniently.

With reference to FIGS. 1 and 2, in the handcart of this embodiment, support legs 8 are arranged at one end of the frame 1 away from the wheels 2, the support legs 8 are fixed on the frame 1, and the support legs 8 are configured to support the handcart, so that the handcart is in the static state. When the handcart is in the static state, the support legs 8 and the wheels 2 simultaneously support the frame 1, thereby ensuring the stability of handcart.

With reference to FIGS. 1 and 2, in the handcart of this embodiment, two wheels 2 and two support legs 8 are arranged, the two wheels 2 and the two support legs 8 are respectively located on both sides of the frame 1, and the two wheels 2 and the two support legs 8 are correspondingly arranged. The two wheels 2 are arranged at one end of the frame 1, and the two support legs 8 are arranged at the other end of the frame 1, which is equivalent to setting support points at four corners of the bottom of the frame 1, thereby enhancing the stability of the handcart.

With reference to FIGS. 1 and 2, the handcart of this embodiment further includes: handles 5, where the handles 5 are connected to the frame 1, and the handles 5 are located at one end of the frame 1 away from the wheels 2; an adjusting assembly 6, where the adjusting assembly 6 is fixed on the frame 1, the handles 5 are connected to the adjusting assembly 6, and the handles 5 are rotatably arranged relative to the adjusting assembly 6, so that the handles 5, by rotating, can be opened or retracted. The handles 5 are fixed on the frame 1 through the adjusting assembly 6, and the handles 5 are rotatably arranged, so that the opened state and the retracted state can be achieved and switched. Before moving of the handcart, the handles 5 are opened by rotating, and the handles 5 are pushed to drive the handcart to move forward; and when the handcart is in the static state, the handles 5 are rotated in the opposite direction, and the handles 5 are retracted to a position close to the frame 1 to reduce the space occupied by the handcart.

Figure 3:
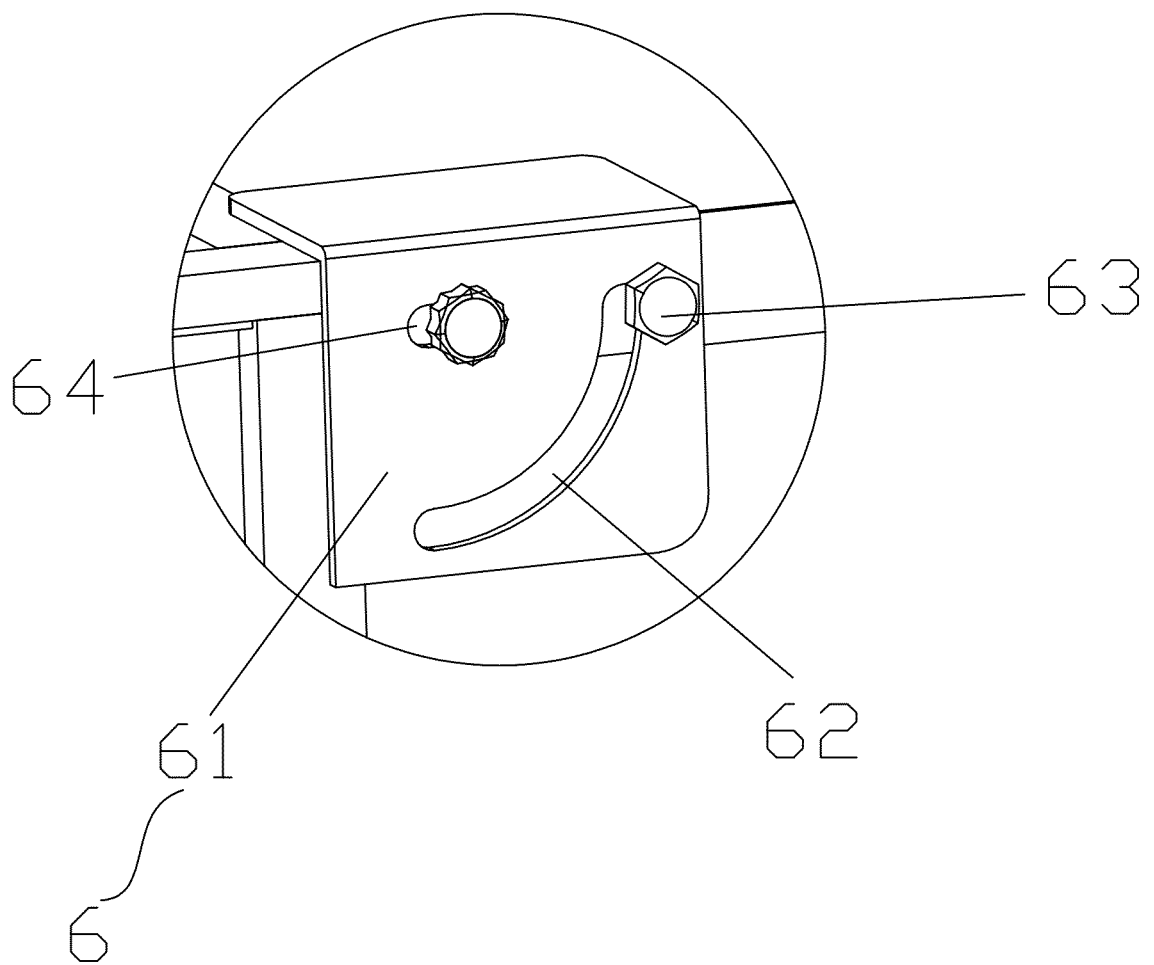
FIG. 3 is a partial enlarged view of a portion A in FIG. 1.
Figure 4:
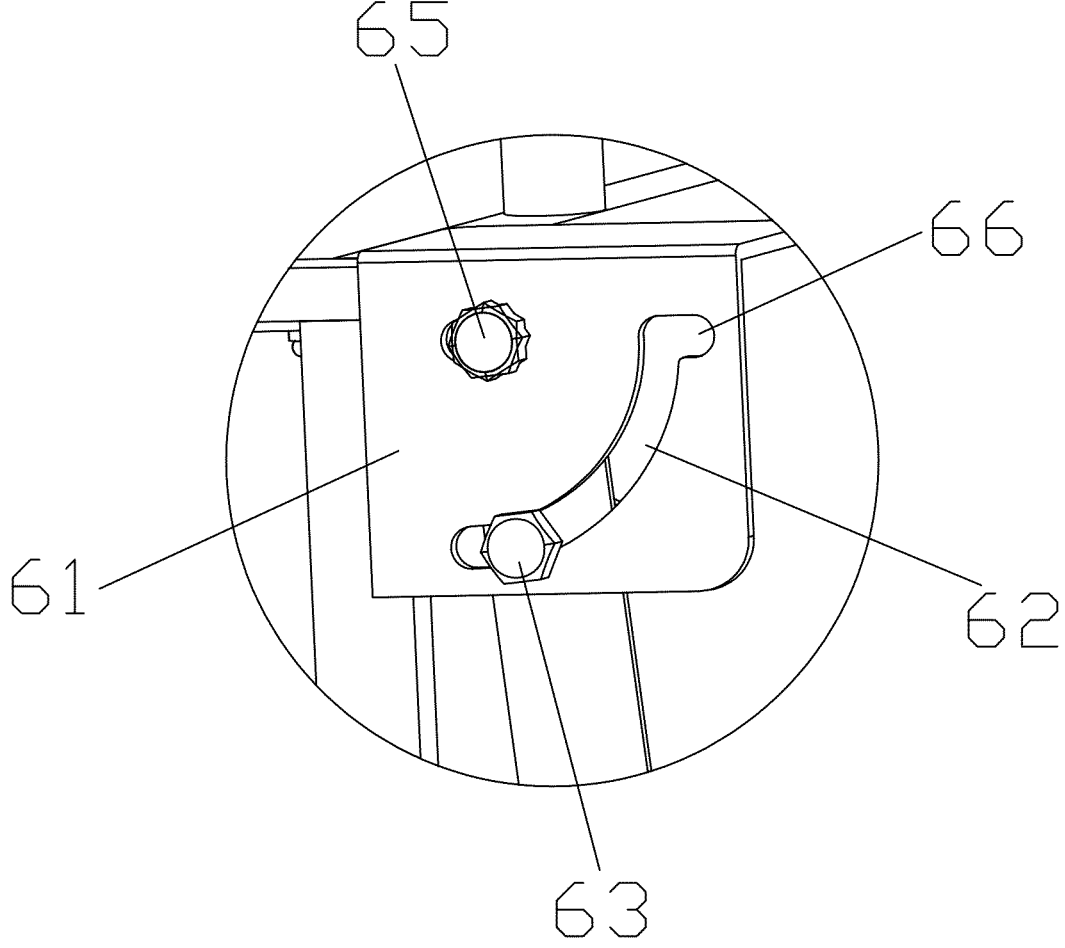
FIG. 4 is a partial enlarged view of a portion B in FIG. 2.

With reference to FIGS. 3 and 4, in the handcart of this embodiment, the adjusting assembly 6 includes: an adjusting plate 61, where the adjusting plate 61 is fixed on the frame 1; an arc-shaped slot 62, where the arc-shaped slot 62 is arranged to penetrate through the adjusting plate 61; and a first fixing member 63, where the first fixing member 63 penetrates through the arc-shaped slot 62 and is connected to the handles 5. The first fixing member 63 slides in the arc-shaped slot 62 to drive the handles 5 to rotate relative to the adjusting assembly 6. By sliding the first fixing member 63 back and forth in the arc-shaped slot 62, the handles 5 are driven to rotate repeatedly, to achieve the opened state and the retracted state of the handles 5.

With reference to FIGS. 3 and 4, in the handcart of this embodiment, the adjusting assembly 6 further includes: a shifting slot 64, where the shifting slot 64 is arranged to penetrate through the adjusting plate 61, and when the handles 5 are in the opened state, the extension direction of the shifting slot 64 is parallel to the extension direction of the handles 5; a second fixing member 65, where the second fixing member 65 penetrates through the shifting slot 64 and is connected to the handles 5, the second fixing member 65 is rotatably arranged relative to the handles 5, and the second fixing member 65 is movably arranged inside the shifting slot 64; and a clamping slot 66, where the clamping slot 66 is communicated with the arc-shaped slot 62, the first fixing member 63 can be movably arranged in both the clamping slot 66 and the arc-shaped slot 62, the extension direction of the clamping slot 66 and the extension direction of the shifting slot 64 are on the same straight line, and the clamping slot 66 is configured for clamping the first fixing member 63. Due to such arrangement, when the handles 5 are in the opened state, the clamping slot 66 clamps the first fixing member 63 to prevent the handles 5 from retracting due to the movement of the first fixing member 63 in the arc-shaped slot 62 driven by gravity.

With reference to FIGS. 3 and 4, in the handcart of this embodiment, the length of the clamping slot 66 is the same as the length of the shifting slot 64, so that the distance of moving the second fixing member 65 inside the shifting slot 64 is equal to the distance of moving the first fixing member 63 inside the clamping slot 66. The clamping slot 66 and the shifting slot 64 are correspondingly arranged, to ensure the stability of the handles 5 in the opened state.

With reference to FIGS. 1 and 2, the handcart of this embodiment further includes two clamping components 7, both the two clamping components 7 are connected to the frame 1, the two clamping components 7 are located at both ends of the workbench 3 respectively, and the goods carried on the workbench 3 are clamped through the two clamping components 7. The workbench 3 not only serves as a workspace but also as a loading platform for transporting goods. The clamping components 7 are arranged on both sides of the workbench 3 to prevent the goods from slipping during transportation.

With reference to FIGS. 1 and 2, in the handcart of this embodiment, a placement space 71 is arranged between the frame 1 and either of the two clamping components 7, and tools of a certain length sequentially penetrate through the two placement spaces 71, so that they are clamped by the two clamping components 7. The placement spaces 71 are arranged in the clamping components 7. Tools of certain lengths, such as shovels, sticks or long hooks, sequentially penetrate through the two placement spaces 71, so that they are clamped by means of two clamping components 7 for transport, thus enriching the types of transported goods and expanding the scope of use. A fixing rod 13 is further arranged on one side of the frame 1 near the handles 5, and the horizontal plane on which the first bearing platform 41 is located coincides with the horizontal plane on which the fixing rod 13 is located (as shown in FIG. 1). Such design further results in that the first bearing platform 41 and the fixing rod 13 are capable of carrying tools of certain lengths, and the use is flexible and changeable.

Figure 5:
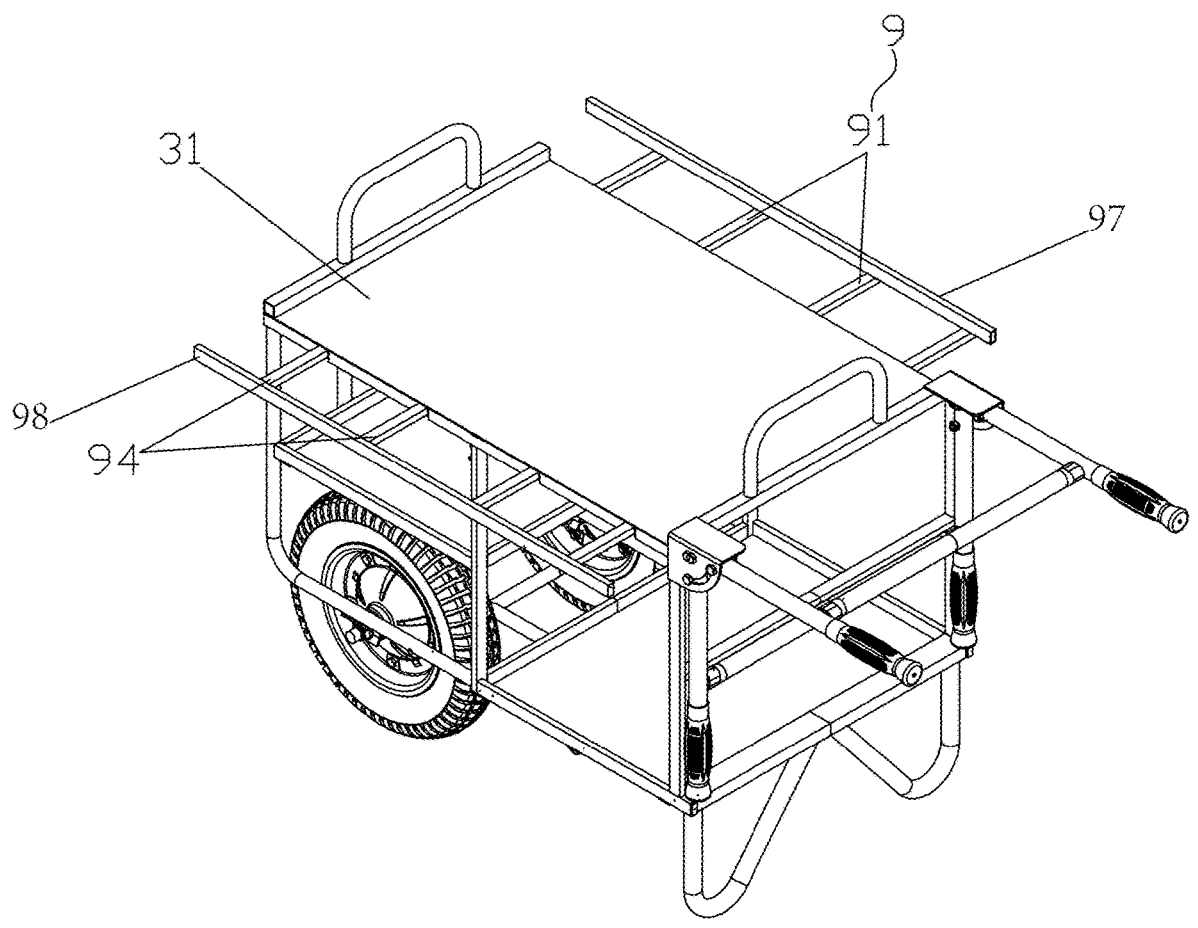
FIG. 5 is a structural schematic diagram of a telescopic assembly of a handcart used in an embodiment of the present disclosure.

With reference to FIG. 5, in the handcart of this embodiment, a telescopic assembly 9 is arranged on the workbench 3, and the telescopic assembly 9 is adjusted to expand the operating space of the workbench 3 or carry larger-sized boxes.

Figure 6:
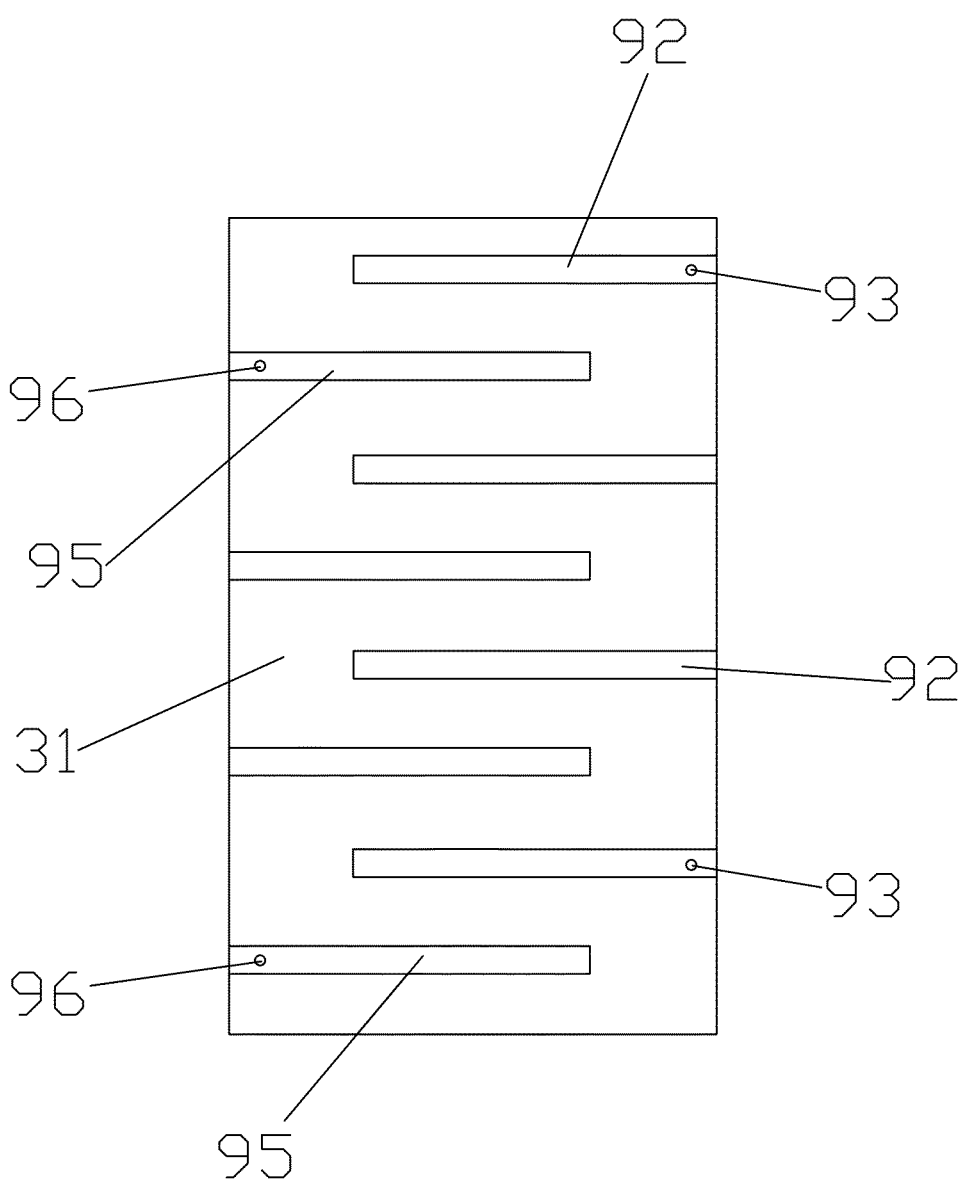
FIG. 6 is a structural schematic diagram of a view of first sleeves and second sleeves of a handcart used in an embodiment of the present disclosure.
Figure 7:
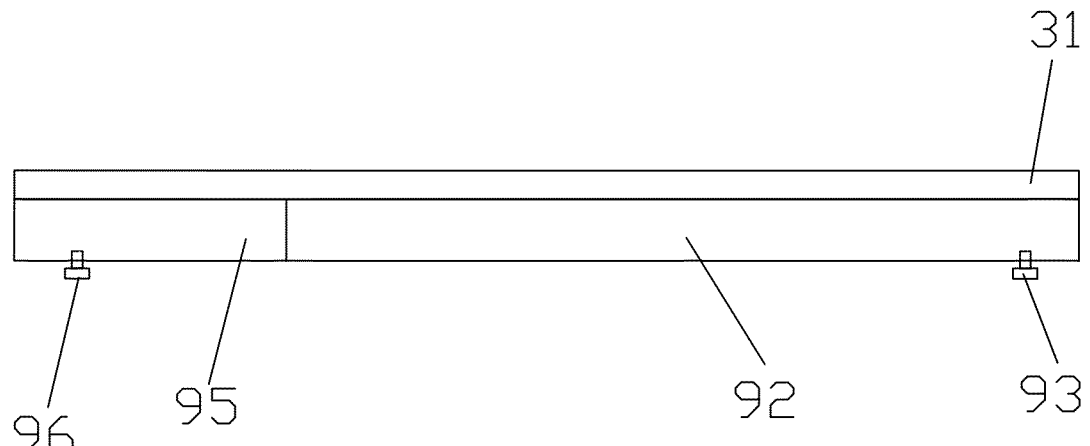
FIG. 7 is a structural schematic diagram of another view of first sleeves and second sleeves of a handcart used in an embodiment of the present disclosure.

As shown in FIGS. 5, 6, and 7, the telescopic assembly 9 is arranged on both ends of a working plate 31 on the workbench 3, and includes a first telescopic portion and a second telescopic portion, where the first telescopic portion and the second telescopic portion are telescopic relative to both ends of the working plate 31. The first telescopic portion includes a first connecting rod 97, a plurality of first sleeves 92 and a plurality of first telescopic rods 91, where one end of each of the plurality of first telescopic rods 91 is connected to the first connecting rod 97. The plurality of first sleeves 92 and the plurality of first telescopic rods 91 are arranged in one-to-one correspondence, the plurality of first telescopic rods 91 are spaced apart from and parallel to each other, each of the first sleeves 92 is fixed below the working plate 31, and each first sleeve 92 is correspondingly sleeved on each first telescopic rod 91. The first connecting rod 97 is pushed or pulled, so that each first telescopic rod 91 stretches or retracts inside each first sleeve 92, thereby expanding the usable area of the workbench 3. First locking members 93 are arranged on the first sleeves 92 that are connected to both ends of the first connecting rod 97, and the first locking members 93 are rotatably arranged relative to the first sleeves 92. The first locking members 93 are rotated to connect the first locking members 93 to the first telescopic rods 91. When each first telescopic rod 91 stretches or retracts to a certain length, two first locking members 93 are used to fix the first telescopic portion on the working plate 31, so that the firmness of the first telescopic portion is reinforced.

The second telescopic portion includes a second connecting rod 98, a plurality of second sleeves 95 and a plurality of second telescopic rods 94, and the structural design is similar to that of the first telescopic portion. The plurality of second sleeves 95 of the second telescopic portion and the plurality of first sleeves 92 of the first telescopic portion are alternately arranged, and each second sleeve 95 is parallel to each corresponding first sleeve 92 (as shown in FIG. 6). Second locking members 96 are further arranged on the two second sleeves 95 at both ends of the second connecting rod 98. The second locking members 96 can be rotatably arranged. The second locking members 96 are rotated, so that the second locking members 96 are connected to the second telescopic rods 94, and the second telescopic portion is fixed on the working plate 31.

It should be noted that the terms "first", "second", etc. in the description, claims and above accompanying drawings are used to distinguish similar objects and are not necessarily intended to indicate a specific order or sequence. It should be understood that these terms can be interchanged in appropriate circumstances, so that the embodiments of the present disclosure described herein can be implemented in a different order than that illustrated or described herein. Further, the terms "including" and "having" and any variations thereof are intended to cover non-exclusive inclusion. For example, the process, method, system product or apparatus that comprises a series of steps or units does not necessarily include only those steps or units listed explicitly, but may include other steps or units that are not explicitly listed or are inherent to the process, method, product or apparatus.

Optionally, for the specific examples in this embodiment, reference can be made to the examples described in the above embodiments, and will not be repeated here in this embodiment.

The serial numbers of the embodiments of the present disclosure are for description only and do not represent the advantages or disadvantages of the embodiments.

In the above embodiments of the present disclosure, each embodiment is described with its own emphasis. For parts that are not described in detail in a certain embodiment, please refer to the relevant descriptions of other embodiments.

What is described above is merely the preferred implementation of the present disclosure. It should be noted that for those of ordinary skill in the art, they may make several improvements and modifications on the premise without deviating from a principle of the present disclosure, and these improvements and modifications shall fall within the protection scope of the present disclosure.

What is claimed is:

1. A handcart, comprising:
a frame, wherein the frame comprises an accommodating cavity for accommodating goods and two stand columns, wherein the two stand columns are correspondingly arranged, the two stand columns are connected to the frame, the two stand columns form a stand column pair, and an extension direction of the stand column pair is perpendicular to the frame;
wheels, wherein the wheels are connected to the frame, and the wheels are arranged relative to the frame in a rotatable manner;
a workbench, wherein the workbench is arranged on the frame, the workbench is configured for carrying the goods, and the workbench is located outside the accommodating cavity; and
a plurality of bearing platforms, wherein all the plurality of bearing platforms are arranged inside the accommodating cavity, the plurality of bearing platforms are located on both sides of the stand column pair, the plurality of bearing platforms are parallel to the workbench, and the plurality of bearing platforms are spaced apart from each other, so that each bearing platform is on a unique horizontal plane;
wherein the handcart further comprises handles and an adjusting assembly;
wherein the adjusting assembly comprises:
an adjusting plate, which is fixed on the frame;
an arc-shaped slot, wherein the arc-shaped slot is arranged to penetrate through the adjusting plate;
a first fixing member, wherein the first fixing member penetrates through the arc-shaped slot and is connected to the handles;
a shifting slot, wherein the shifting slot is arranged to penetrate through the adjusting plate, and when the handles are in an opened state, an extension direction of the shifting slot is parallel to an extension direction of the handles;
a second fixing member, wherein the second fixing member penetrates through the shifting slot and is connected to the handles, the second fixing member is rotatably arranged relative to the handles, and the second fixing member is movably arranged inside the shifting slot; and
a clamping slot, wherein the clamping slot is communicated with the arc-shaped slot, the first fixing member is configured to be movably arranged in both the arc-shaped slot and the arc-shaped slot, an extension direction of the clamping slot and the extension direction of the shifting slot are on the same straight line, and the clamping slot is configured for clamping the first fixing member.

2. The handcart according to claim 1, wherein the stand column pair is located in a middle of the frame, the wheels are located at one end of the frame, and the plurality of bearing platforms comprise a first bearing platform and a second bearing platform,
wherein the first bearing platform is located between the wheels and the workbench, the second bearing platform is arranged on one side of the stand column pair away from the first bearing platform, and a distance between the first bearing platform and the workbench is less than a distance between the second bearing platform and the workbench.

3. The handcart according to claim 2, wherein support legs are arranged at one end of the frame away from the wheels, the support legs are fixed on the frame, and support legs are configured to support the handcart, so that the handcart is in a static state.

4. The handcart according to claim 3, wherein two wheels and two support legs are arranged, the two wheels and the two support legs are respectively located on both sides of the frame, and the two wheels and the two support legs are correspondingly arranged.

5. The handcart according to claim 1,
wherein the handles are connected to the frame, and the handles are located at one end of the frame away from the wheels; and
the adjusting assembly is fixed on the frame, the handles are connected to the adjusting assembly, and the handles are rotatably arranged relative to the adjusting assembly, so that the handles, by rotating, is configured to be opened or retracted.

6. The handcart according to claim 5, wherein
the first fixing member slides in the arc-shaped slot to drive the handles to rotate relative to the adjusting assembly.

7. The handcart according to claim 1, wherein a length of the clamping slot is the same as a length of the shifting slot.

8. The handcart according to claim 1, wherein the handcart further comprises two clamping components, both the two clamping components are connected to the frame, the two clamping components are located at both ends of the workbench respectively, and the goods carried on the workbench are clamped through the two clamping components.

9. The handcart according to claim 8, wherein a placement space is arranged between the frame and either of the two clamping components, and tools sequentially penetrate through the two placement spaces, so that they are clamped by the two clamping components.

\* \* \* \* \*